A. KRIEG.
TRACTOR TRANSMISSION MECHANISM.
APPLICATION FILED OCT. 10, 1917.
1,291,932.
Patented Jan. 21, 1919.
2 SHEETS—SHEET 1.
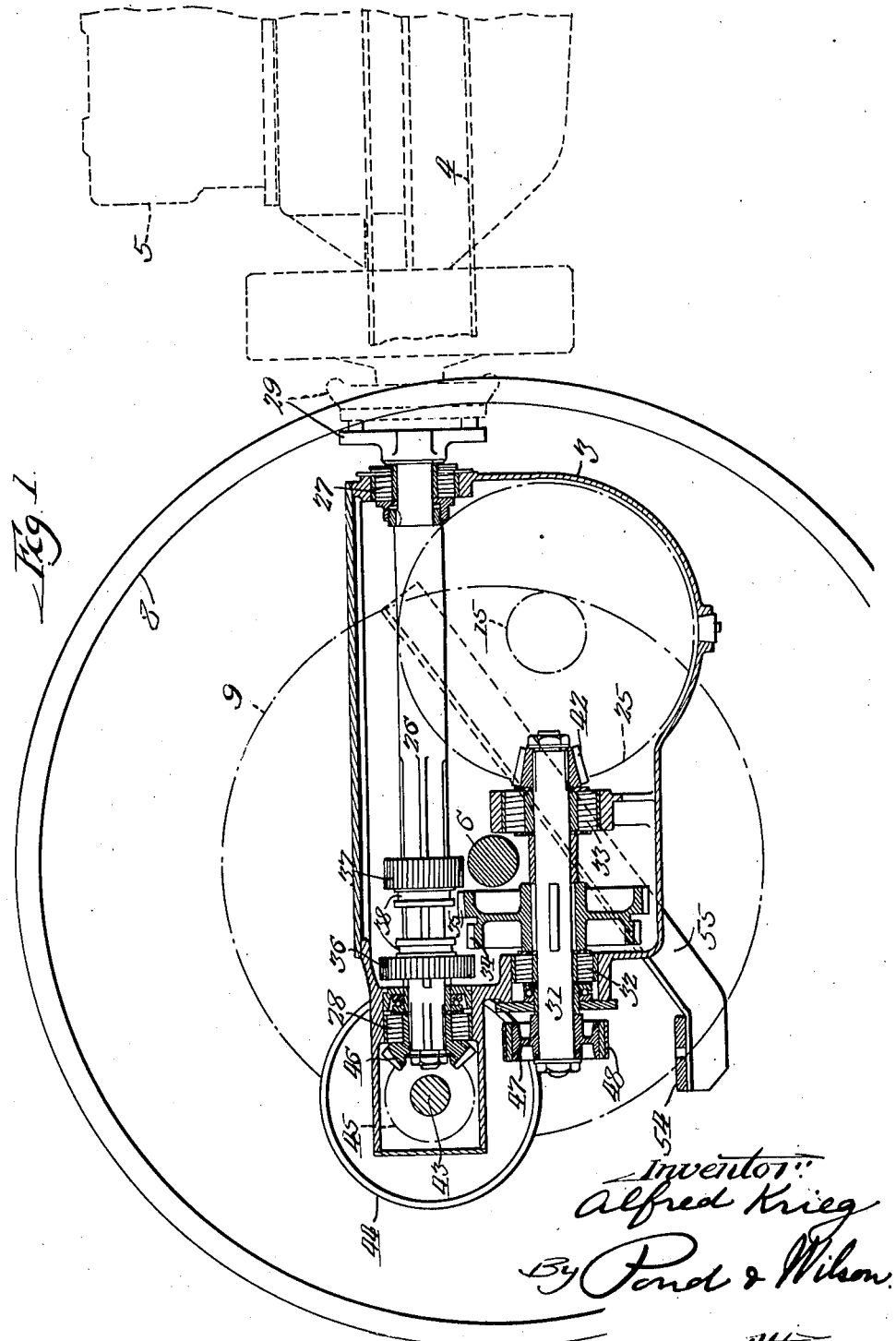

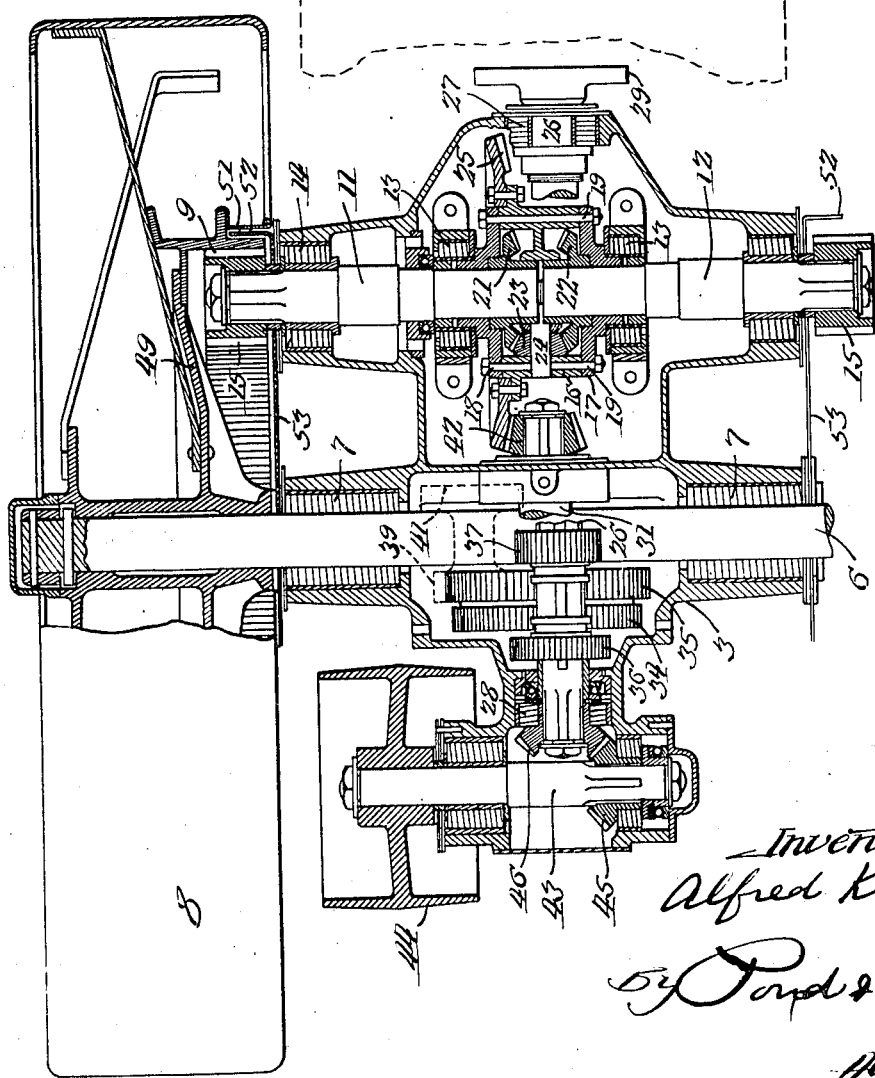

UNITED STATES PATENT OFFICE.

ALFRED KRIEG, OF MINNEAPOLIS, MINNESOTA, ASSIGNOR TO EMERSON-BRANTINGHAM COMPANY, OF ROCKFORD, ILLINOIS, A CORPORATION OF ILLINOIS.

TRACTOR TRANSMISSION MECHANISM.

1,291,932.   Specification of Letters Patent.   Patented Jan. 21, 1919.

Application filed October 10, 1917. Serial No. 195,687.

*To all whom it may concern:*

Be it known that I, ALFRED KRIEG, a citizen of the United States, residing at Minneapolis, in the county of Hennepin and State of Minnesota, have invented certain new and useful Improvements in Tractor Transmission Mechanism, of which the following is a specification.

This invention relates in general to traction engines, and to the transmission mechanism thereof.

One of the primary objects of the present invention is to provide in a traction engine a change speed transmission so designed and arranged that a maximum working and draw-bar power may be obtained from a given engine power.

In further regard to the transmission, I have aimed to arrange it in a novel and compact manner about the axle of the drive wheels, so that the engine may be positioned close thereto, thereby giving a relatively short wheel base and providing a construction in which very little frame structure is required. Thus, an exceptionally light weight but large powered tractor may be obtained having relatively large draw-bar power.

I have further aimed to transmit the drive from the engine to the drive wheels in a novel manner, by which the greatest efficiency is obtained and the power is so applied to the drive wheels that the lifting force following from such application of the driving power constitutes the driving wheel axle and all structure supported thereon, a full-floating structure when the tractor is in operation. A still further object is to house the transmission mechanism in an oil-tight casing and to run the mechanism in an oil bath, and to house the large drive gears on the drive wheels in a dust-tight casing, to insure greater durability and efficiency.

Another object is to mount a thresher or power pulley at the rear of the tractor transmission where the belt power can be taken very conveniently and to good advantage, and to drive this pulley in a direct manner from the main drive shaft so that the drive may be transmitted directly from the engine to the thresher pulley.

These and other objects and attendant advantages will be more fully appreciated as the invention becomes better understood by reference to the following description when considered in connection with the accompanying drawings, in which—

Figure 1 is a vertical longitudinal sectional view centrally through a traction engine embodying my improvements, certain of the parts being illustrated diagrammatically; and Fig. 2 is a broken horizontal sectional view through the driving mechanism of the traction engine shown in Fig. 1, showing the front and rear ends of the drive shaft and the thresher pulley shaft in one sectional plane and showing the drive wheel axle, the jack shaft and its differential in a lower plane.

The traction engine in which I have embodied my improvements is, in this instance, of the four-wheel type adapted for general purposes and of special service for various kinds of farm work. A selective type transmission is provided with two speeds forward and one reverse, although the speeds may be easily changed within the scope of the invention.

Speaking generally of the invention, I have provided a transmission arranged in a novel manner about the axle of the drive wheels, permitting the axle to be journaled in the transmission casing and the engine to be close to the transmission casing and connected directly to the driving shaft of the transmission. Thus, not only is the motive power transmitted in a very direct and efficient manner to the drive wheels but a unique frame structure is provided in which the transmission casing itself forms the entire rear frame structure, and the arrangement with all allows the engine to be positioned in such proximity to the drive wheels as to afford a relatively short wheel base. These features coupled with others prefaced above all promote to a surprising degree, lightness in weight and draft and efficiency in operation.

The transmission casing, designated generally by reference character 3, is shaped to house and support the drive wheel axle, the jack shaft and its differential, the change speed transmission and the thresher pulley or power shaft, and in reality, forms the entire frame structure for the rear end of the tractor. The front frame structure, illustrated but diagrammatically, is in the form of fore-and-aft side channels 4 secured at their rear ends to the transmission casing. Upon the side channels is mounted in close relation to the transmission casing, the engine 5. For clarity of illustration, I have omitted from the drawing those parts and accessories of the transmission which are not essential to an understanding of the present invention and which form no part thereof.

The driving wheel axle 6 extending entirely through the transmission casing is journaled in relatively long roller bearings 7 therein and is equipped beyond each bearing with a large drive wheel, designated generally by charter 8. The driving wheels are mounted on the axle in any suitable manner so as to be held in position thereon against lengthwise displacement and preferably so that the axle turns with one of the drive wheels and the other drive wheel is freely revoluble about the axle, to allow for the differential action required. In the present case, only one of the drive wheels is illustrated, this being connected to revolve with the axle, as shown.

The driving wheels are revolved through the agency of a jack shaft and drive pinions and for this purpose, each drive wheel is equipped with a peripheral internal drive gear 9, the pitch diameter only of which is illustrated in Fig. 1. The jack shaft driven by a differential, is of a sectional construction consisting of the shaft sections 11 and 12, each journaled at their inner and outer ends in suitable anti-friction bearings 13 and 14 respectively, in the casing 3 and equipped at their outer ends with a spur drive pinion 15 in mesh with its respective drive gear. The jack shaft, it will be noted is positioned forwardly of the axle 6 and below the same, so that the power is applied to the drive wheels in a most advantageous manner. The inner ends of the jack shaft sections are connected by a differential which may be of any suitable or preferred construction. In the present instance, this differential is housed in a casing comprising the center piece 16 and end pieces 17 and 18 secured together by bolts 19, and revolves on the inner roller bearings 13. The opposed bevel gears 21 and 22 secured respectively to the jack shaft sections 11 and 12 mesh with a companion driving bevel gear 23 journaled on a stub shaft 24 extending inwardly from the casing member 16. The differential is revolved through the agency of a large bevel drive gear 25 circumscribing and secured to the differential casing. It will be manifest that when the differential is revolved the shaft sections 11 and 12 will be rotated at equal speeds, and that when the machine is turning a corner or for any other reason, greater resistance is offered to one of the drive pinions 15 than is offered to the other, the differential mechanism will permit relative movement between the shaft sections so as to compensate for the turning movement or the unequal resistance offered, thereby performing the customary differential function.

The transmission mechanism for driving the differential drive gear 25 will now be described. A fore-and-aft drive shaft 26 journaled above the axle 6 in suitable bearings 27 and 28 on the transmission casing substantially on the medial longitudinal axis of the tractor, is adapted to be connected at its front end by means of a suitable clutch 29 to the engine 5. Thus, the driving shaft 26, co-extensive with the length of the transmission casing, is in reality, a high speed shaft adapted to be driven in a most direct manner by the engine. This driving shaft may be connected at the will of an operator to a fore-and-aft driven shaft 31 journaled below the axle 6 in suitable bearings 32 and 33 on the casing 3. Gearing for establishing the driving connection between the shafts 26 and 31 is of the selective type, providing two speeds forward and one reverse. For this purpose, high and low speed gears 34 and 35, respectively fixed to the driven shaft 31 at the rear of the axle 6, are adapted to be respectively driven by the driving gears 36 and 37 splined on the driving shaft 26. By shifting the gear 37 rearwardly, it will mesh with the gear 35 on the driven shaft and thus establish the low speed drive. After the gear 37 has been disengaged, the gear 36 may be engaged with the gear 34 to establish the high speed drive. The operating mechanism for shifting the gears 36 and 37 is not shown, since such mechanisms are well understood in the art and in the present instance form no part of the present invention. When shifting gears of this character, however, it is generally customary to provide forked shifting arms engaged at their ends in annular grooves 38 in the shiftable elements. The reverse speed gearing may be of any suitable arrangement, such for instance as an idler gear 39 indicated diagrammatically in Fig. 2, in mesh with the gear 35 and connected with another idler gear 41 with which the driving gear 37 is adapted to be engaged when moved forwardly from the position in which it is shown. The driven shaft 31, in the same horizontal plane as the jack shaft, is equipped at its front end with a bevel pinion 42 in mesh with its companion bevel gear 25 on the differential. This completes the driving connection between the engine and the drive wheels.

The thresher and general purpose power pulley, I have arranged at the rear of the transmission on a transverse axis in such manner as to be driven directly by the driving shaft and to be conveniently accessible and readily adapted for service. The transverse shaft 43 to one end of which is secured the thresher or power pulley 44, is journaled in suitable bearings in a rear extension of the transmission casing and is equipped with a bevel gear 45 in mesh with a companion bevel gear 46 fixed to the rear end of the driving shaft 26. Obviously, the motive power is transmitted directly to the power shaft 43 through the agency of a driving shaft 26 so that the thresher pulley is in direct driving connection with the engine. By arranging the thresher pulley in this manner it is more serviceable than thresher pulleys positioned at one end of the frame in front of the driving wheels, and moreover, it enables the engine to be more closely coupled to the transmission, thereby enabling a short wheel base. The power pulley shaft when not in use may be disconnected from the driving connection in any suitable manner.

A suitable brake is employed, in the form of a friction drum and band applied directly to the rear end of the driven shaft 31. The drum 47 secured to the shaft 31 may be gripped by the band 48 which may be operated by any suitable or preferred means. While a friction brake applied at this point is very effective, it does not constitute any important part of the invention and any suitable braking means may be employed.

The transmission casing has been designed to completely house all of the working parts of the drive mechanism except, of course, the drive wheel gears and pinions, and to contain oil so that the gears will run in an oil bath. In order that the drive wheel gears and pinions may also be housed in a dust proof case, I have provided separate housings for these gears, which are additional factors in increasing the efficiency of the machine. As shown in Fig. 2, the internal gear 9 constitutes the outer wall of a substantially dust-tight casing fixed to the drive wheel, including the radial wall 49 formed integral with the hub of the wheel. The drive gear is, in fact, supported by and secured to the drive wheel through the agency of this radial wall 49, although additional brace and tie rods are employed between this structure and the rim of the wheel. The peripheral wall of the wheel casing is constructed to provide a relatively deep annular groove 51 open at the inner side of the wheel and adapted to receive the annular flange 52 of a stationary casing section 53, fixed with respect to the jack shaft and axle and constituting the inner wall of the casing which houses the drive gear and its pinion. In this joint or seal the inner casing section 53 and its annular flange 52 remain stationary, and the outer section connected with the wheel revolves. Such a joint effectually serves to seal the casing against the leakage of oil contained therein for lubricating the drive wheel gears and to preclude the entrance of destructive foreign matter thereto.

Since a tractor of this character is employed mainly for pulling purposes, a transverse draw bar 54 is attached to the rear of the tractor and serves as the means to which the farming implement or load of any description, is attached. The draw bar, in this instance, is connected to the frame by means of depending underhung draft bars 55.

In this tractor, it will be especially noted that the axle of the drive wheels is journaled on the transmission casing together with the jack shaft and the several shafts of the transmission so that it is not necessary to provide any frame structure for the rear of the tractor in addition to the transmission casing itself. This, of course, promotes lightness of draft, and in view of the fact that the engine may be arranged in such close relation to the transmission and drive wheels, it is possible to utilize a high powered engine in a tractor of small wheel base and of substantially small weight. The manner, however, in which the driving mechanism is arranged, and the motive power is transmitted to the drive wheel is one of the most important features of the invention. By reason of this arrangement, the engine power is taken directly by the high speed driving shaft 26 and is transmitted therefrom through the agency of change speed gears at the rear of the axle 6 to the driven shaft 31. This shaft transmits the drive forwardly beyond the axle to the differential and jack shaft which are co-planar with the change speed shaft. The sectional jack shaft, of course, directly drives the wheels and the driving power is applied forwardly of the axle in such manner that there is an opposed lifting force in which the drive pinions have a tendency to climb the drive gears. When in operation, this force serves to support the entire rear frame and transmission mechanism, so that the drive wheel axle is, in reality, full floating. In consequence of this and the factors of light draft, short wheel base, of the efficient mounting of all drive mechanism, a maximum draw bar power is obtained. In fact, the draw bar power is very nearly the equivalent of the engine power.

It is believed that the foregoing conveys a clear understanding of the construction and operation of my improvements and of the objects prefaced above, and it should be understood that while I have illustrated one working embodiment thereof, various changes may be made in the construction and operation without departing from the scope and spirit of the invention as expressed in the appended claims.

I claim:

1. In a tractor transmission mechanism, the combination of a transmission casing, a through axle journaled on the casing, a jack shaft journaled on the casing forwardly of and below the axle, a fore-and-aft driving shaft journaled on the casing above the axle and extending forwardly and rearwardly thereof, and mechanism for transmitting drive from the driving shaft rearwardly of the axle, thence downwardly below the axle and thence forwardly beyond the same to the jack shaft.

2. In a tractor transmission mechanism, the combination of a transmission casing, a through axle for the drive wheels journaled on the casing, a transverse jack shaft journaled on the casing forwardly of the axle and equipped at its outer ends with driving pinions, a differential connecting the inner ends of the jack shaft, and mechanism within the transmission casing for transmitting drive from a point forwardly of and above the axle rearwardly beyond the axle and thence below the same and thence forwardly thereof to the differential.

3. In a tractor transmission mechanism, the combination of a transmission casing, a through axle for the main drive wheels journaled on the casing, a fore-and-aft driving shaft journaled on the casing above the axle and extending forwardly and rearwardly beyond the same and adapted to be driven at its front end from an engine positioned in proximity to the front of the driving wheels, a fore-and-aft driven shaft journaled on the casing below the axle and extending forwardly and rearwardly beyond the same, gearing adapted to connect the driving and driven shafts at the rear of the axle, and means connected to the forward end of the driven shaft and adapted to transmit drive to the drive wheels.

4. The combination of a transmission casing, a drive wheel axle journaled thereon, a sectional jack shaft journaled on the casing forwardly of said axle and equipped at its outer ends with drive pinions, a differential connecting the inner ends of the jack shaft, a fore-and-aft driving and driven shaft journaled on the casing, respectively above and below the axle, gearing adapted to connect the driving and driven shafts at the rear of the axle, and a driving connection between the forward end of the driven shaft and the differential.

5. In a tractor transmission mechanism, the combination of drive wheels each equipped with a drive gear, an engine positioned intermediate the drive wheels in proximity to the front thereof, a transverse sectional jack shaft disposed forwardly of and below the axis of the drive wheels and equipped at its outer ends with drive pinions in mesh with the drive gears, and transmission mechanism between the engine and jack shaft arranged so that the power is transmitted from the engine rearwardly beyond the axis of the main drive wheels, thence downwardly below said axis and thence forwardly beyond said axis and to the jack shaft.

6. In a tractor transmission mechanism, the combination of the main drive wheels each equipped with a drive gear, an engine positioned forwardly of and intermediate the drive wheels in close proximity thereto, a driving shaft co-axial with the engine shaft, adapted to be connected thereto by means of a clutch and extending rearwardly above and beyond the axis of the drive wheels, a driven shaft parallel with the driving shaft and positioned below said drive wheel axis and extending forwardly and rearwardly beyond the same, gearing on the driving and driven shafts at the rear of said drive wheel axis adapted to be connected at will for establishing different driving speeds, a transverse sectional jack shaft the sectional portions of which are connected by a differential and are equipped at their outer ends with the driving pinions in mesh with the drive wheel gears, and a bevel gear connection between the forward end of the driven shaft and the differential, whereby power from the engine is transmitted through the driving shaft to the driven shaft through the agency of said gearing located rearwardly of the drive wheel axis, thence transmitted from the driven shaft forwardly of said axis to the jack shaft differential and to the drive wheels.

7. In a tractor transmission mechanism, the combination of drive wheels each equipped with an internal drive gear, a transverse sectional jack shaft equipped at its outer ends with drive pinions in mesh with the internal drive gears forwardly of the axis of the drive wheels, a fore-and-aft driving shaft positioned above the drive wheel axis and adapted to be driven at its forward end and extending rearwardly beyond said axis, a fore-and-aft driven shaft positioned below the drive wheel axis and extending forwardly and rearwardly thereof, gearing on the driven shaft rearwardly of said drive wheel axis adapted to be driven by gearing on the driving shaft, and a driving connection between the driven shaft and jack shaft forwardly of said drive wheel axis.

8. In a tractor transmission mechanism, the combination of drive wheels, each equipped with a drive gear, a through axle for the drive wheels, a transmission casing on which the axle is journaled and which constitutes the frame for the rear end of the tractor, a driving shaft positioned above the drive wheel axle and journaled at its front and rear ends in the transmission casing forwardly and rearwardly, respectively of said axle and adapted to be connected at its forward end to an engine positioned in close proximity to the front of the drive wheels, a driven shaft mounted on the casing below the driving shaft and extending forwardly and rearwardly of said axle, gearing within the casing adapted to connect the driving and driven shafts rearwardly of said axle, a transverse sectional jack shaft journaled in the casing forwardly of the axle and equipped at its outer ends with driving pinions in mesh with the drive wheel gears, a differential connecting the inner ends of the jack shaft, and a bevel gear connection between the forward end of the driven shaft and the differential.

9. In a tractor transmission mechanism, the combination of driving wheels each equipped with a drive gear, a through axle for the wheels, a sectional jack shaft positioned forwardly and below the axle and equipped at its outer ends with pinions in mesh with the drive wheel gears, a differential connecting the inner ends of the jack shaft, fore-and-aft driving and driven shafts positioned respectively above and below the axles, gearing adapted to connect the driving and driven shafts at the rear of the axle, and a driving connection between the forward end of the driven shaft and the differential.

10. In a tractor transmission mechanism, the combination with a transmission casing, upon which the driving wheel axle is journaled, of a fore-and-aft driving shaft journaled at its front and rear ends on the casing above the axle and adapted to be connected at its front end to the engine so as to be driven directly thereby and to be connected intermediate its ends with the drive wheels for driving the same, a transverse power pulley shaft journaled on the transmission casing at the rear of and extending laterally on both sides of the driving shaft, a driving connection between the power shaft and the driving shaft at one side of the latter, and a power pulley mounted on the power shaft at the opposite side of the driving shaft.

11. In a tractor transmission mechanism, the combination of a pair of drive wheels each equipped with a drive gear, a through axle for the wheels, a transmission casing on which the axle is journaled, a transverse sectional jack shaft, the outer ends of which are equipped with driving pinions in mesh with the drive wheel gears, a differential connecting the inner ends of the jack shaft and having a driving bevel gear, a fore-and-aft driving and a driven shaft journaled on the casing respectively above and below the axle, the driving shaft being adapted to be connected at its forward end with an engine positioned in proximity to the front of the driving wheels, differently sized gears fixed to the driven shaft at the rear of the axle, gears splined on the driving shaft and adapted to be moved into and out of mesh with the gears on the driven shaft to establish at will different driving speeds, and a driving pinion fixed to the front end of the driven shaft and in mesh with the bevel driving gear on the differential.

12. In a tractor transmission mechanism, the combination of drive wheels, a transverse sectional jack shaft forwardly of the drive wheel axis and equipped at its ends with drive pinions, a differential connecting the inner ends of the jack shaft, a fore-and-aft driving and driven shaft mounted respectively above and below said drive wheel axis, and driving connections between the driving and driven shafts at the rear of said axis and between the forward end of the driven shaft and the differential.

13. In a tractor transmission mechanism, the combination of drive wheels, a transverse jack shaft forward of the drive wheel axis and equipped at its ends with drive pinions, an engine interposed between and in proximity to the front of the drive wheels, a shaft driven from the engine and extending over and rearwardly of the drive wheel axis, and a driving connection between said drive shaft and the jack shaft including change speed gears disposed rearwardly of said axis.

14. In a tractor, the combination of driving wheels, a transmission casing interposed between and supported by said wheels and constituting the sole rear frame structure, longitudinal side frame members secured at their rear ends to the casing and extending forwardly therefrom, an engine interposed between and mounted on said frame members, a driving shaft in the casing coaxial with the engine shaft and adapted to be driven thereby, and transmission mechanism within the casing between said driving shaft and the wheels.

15. In a traction engine, the combination of drive wheels, an engine mounted intermediate said wheels and in proximity thereto, a transverse jack shaft forward of the axis of the drive wheels and equipped with drive pinions, and transmission mechanism between the engine and said jack shaft, extending rearwardly over and around said axis and thence forwardly to the jack shaft.

16. In a tractor transmission mechanism, the combination of drive wheels, drive pinions for the drive wheels mounted forwardly of the axis thereof, an engine in proximity to the front of the drive wheels, a shaft driven from the engine and extending rearwardly beyond said axis of the drive wheels, and a driving connection between said shaft and the drive pinions including change speed gears rearwardly of said axis.

17. In a tractor, the combination of drive wheels, a transmission casing interposed between and carried by said wheels and constituting the sole rear frame structure, longitudinal side frame members secured at their rear ends to the casing and extending forwardly therefrom and constituting the front frame structure, an engine mounted on the side frame members, and a driving connection between the engine and drive wheels including transmission mechanism in said casing.

18. In a tractor transmission mechanism, the combination of drive wheels, a transverse differential jack shaft forward of the drive wheel axis and equipped with drive pinions, a motor interposed between the drive wheels in proximity to the front thereof, a drive shaft co-axial with the engine shaft and adapted to be directly connected thereto by means of a clutch, a fore-and-aft driven shaft connected at its forward end with the jack shaft differential, and change speed gearing between the driving and driven shafts.

19. In a tractor transmission mechanism, the combination of a transmission casing, fore-and-aft driving and driven shafts mounted in the casing with the latter shaft below the former, a transverse jack shaft journaled in the casing coplanar with the driven shaft and equipped with a differential with which the driven shaft connects at its forward end and equipped also with drive pinions, and change speed gearing within the casing between the driving and driven shafts.

20. In a tractor transmission mechanism, the combination of drive wheels, a through axle therefor, a transverse jack shaft forward of the axle and connected at its outer ends with the wheels, and transmission mechanism for transmitting the drive from a point forwardly and above the axle to a point rearwardly and above the same, thence below the axle and thence forwardly thereof to the jack shaft.

21. In a tractor transmission mechanism, the combination of drive wheels, a transmission casing interposed between and carried by the drive wheels, a transverse jack shaft in said casing equipped with drive pinions, an engine-supporting frame secured at its rear end to and supported thereat by said transmission casing, an engine mounted on said frame, a driving shaft in the transmission above said jack shaft and co-axial with the engine shaft and adapted to be connected thereto by a clutch, and change speed gearing in the transmission between the driving shaft and the jack shaft.

22. In a tractor, the combination of drive wheels, an engine arranged on a fore-and-aft axis intermediate the drive wheels adjacent to the front thereof, a driving shaft in alinement with the engine shaft and adapted to be connected therewith and driven directly thereby, a fore-and-aft driven shaft below the driving shaft, gearing adapted to connect the driving and driven shafts to establish different driving speeds, a transverse jack shaft forwardly of and co-planar with the driven shaft and connected at its outer ends with the drive wheels, and a driving connection between the forward end of the driven shaft and the jack shaft.

23. In a tractor, the combination of drive wheels, a fore-and-aft driving shaft intermediate the drive wheels and adapted to be connected at its front end with the engine, a fore-and-aft driven shaft below the driving shaft, gearing at the rear of the axis of the drive wheels for establishing different driving speeds between the driving and driven shafts, a transverse differential jack shaft forward of and co-planar with the driven shaft and connected with the drive wheels, and a driving connection between the front end of the driven shaft and the differential of the jack shaft.

ALFRED KRIEG.